United States Patent
Donohue

(10) Patent No.: US 8,893,489 B2
(45) Date of Patent: Nov. 25, 2014

(54) ACCESSORY DRIVE FOR HYBRID VEHICLES

(75) Inventor: William Donohue, Milford, MI (US)

(73) Assignee: Robert Bosch GmbH, Stuttgart (DE)

( * ) Notice: Subject to any disclaimer, the term of this patent is extended or adjusted under 35 U.S.C. 154(b) by 809 days.

(21) Appl. No.: 13/163,444

(22) Filed: Jun. 17, 2011

(65) Prior Publication Data
US 2012/0317967 A1 Dec. 20, 2012

(51) Int. Cl.
*F16H 39/02* (2006.01)
*B60K 6/12* (2006.01)
*F02B 67/08* (2006.01)
*B60W 30/18* (2012.01)

(52) U.S. Cl.
CPC ............ *B60K 6/12* (2013.01); *B60W 30/18127* (2013.01); *F16H 39/02* (2013.01); *F02B 67/08* (2013.01); *Y02T 10/6208* (2013.01)
USPC ............................................. 60/414; 60/487

(58) Field of Classification Search
USPC .......................................... 60/414, 423, 487
See application file for complete search history.

(56) References Cited

U.S. PATENT DOCUMENTS

| | | | |
|---|---|---|---|
| 5,635,805 A * | 6/1997 | Ibaraki et al. | 417/231 |
| 6,615,443 B2 | 9/2003 | Otsuni et al. | |
| 7,104,920 B2 | 9/2006 | Beaty et al. | |
| 7,125,362 B2 * | 10/2006 | Beaty et al. | 477/3 |
| 7,690,451 B2 | 4/2010 | Chiao | |
| 7,793,496 B2 * | 9/2010 | Rampen et al. | 60/414 |
| 7,815,001 B2 | 10/2010 | Liljeblad et al. | |
| 2005/0164827 A1 | 7/2005 | Beaty et al. | |
| 2007/0227801 A1 | 10/2007 | Loeffler | |
| 2009/0236156 A1 | 9/2009 | Promersberger et al. | |
| 2010/0186408 A1 | 7/2010 | Rose et al. | |

OTHER PUBLICATIONS

International Search Report and Written Opinion for Application No. PCT/US2012/042610 dated Sep. 25, 2012 (12 pages).

* cited by examiner

*Primary Examiner* — Thomas E Lazo
(74) *Attorney, Agent, or Firm* — Michael Best & Friedrich LLP

(57) ABSTRACT

A vehicle includes an internal combustion engine, a first hydraulic pump/motor coupled with the internal combustion engine, and a second hydraulic pump/motor is coupled with at least one driven wheel of the vehicle. A clutch establishes a driving connection between the first hydraulic pump/motor and the internal combustion engine, and selectively interrupts the driving connection when disengaged. At least one vehicle accessory device is coupled to the first hydraulic pump/motor. The at least one vehicle accessory device is operable under power of the internal combustion engine when the clutch is engaged and the internal combustion engine is running, and the at least one vehicle accessory device is operable directly by the first hydraulic pump/motor operating in a motor mode when the clutch is disengaged, regardless of whether or not the internal combustion engine is running. A corresponding method of operating the vehicle is also provided.

19 Claims, 4 Drawing Sheets

US 8,893,489 B2

ACCESSORY DRIVE FOR HYBRID VEHICLES

BACKGROUND

The present invention relates to hybrid vehicles. More particularly, the invention relates to an accessory drive arrangement in a hybrid vehicle.

Hybrid vehicles can include multiple drive sources, such as an internal combustion engine and an alternate drive source that is not powered by gasoline or another fossil fuel. Hybrid vehicles can achieve fuel consumption reductions by using a regenerative drive strategy in which electrical, mechanical, or hydraulic energy is stored during braking and later used to power the vehicle via the alternate drive source. Additional fuel savings can be achieved by using an start/stop strategy in which the operation of the internal combustion engine is automatically stopped and started based on driving conditions (e.g., the engine can be automatically turned off when the vehicle is cruising (i.e., not accelerating), coasting, braking, and/or comes to a stop, and subsequently automatically re-started as needed).

A variable transmission device may be used in a hybrid vehicle to provide seamless gear ratio changing for driving the wheels of the hybrid vehicle at various speeds while keeping the internal combustion engine's operating speed at a particular speed that results in maximum efficiency. One known type of variable transmission device is a serial hydraulic infinitely variable transmission (IVT), which establishes a hydraulic fluid connection in the drive train to provide seamless "shifting" between forward speed ratios, a neutral state, and reverse speed ratios. At least one known vehicle configuration utilizing a serial hydraulic IVT is described in U.S. Pat. No. 7,793,496. The U.S. Pat. No. 7,793,496 discloses various vehicle transmission configurations in which at least two hydraulic pump/motors are arranged in series along the vehicle drive train. The hydraulic pump/motors operate in various modes and speeds to modulate the speed of a driven wheel(s) somewhat independently from the operating speed of the on-board internal combustion engine.

Most conventional vehicles include a series of mechanically engine-driven accessory devices (e.g., oil pump, engine coolant pump or "water pump", air conditioning compressor, alternator, power steering pump, brake hydraulic pump), some of which are desirable to keep running even when the internal combustion engine is turned off in the start/stop strategy. To keep such accessory devices running, the vehicle must be provided with additional drive means for driving the accessory devices at times of temporary engine stoppage, necessarily adding cost and complexity to the vehicle.

SUMMARY

In one embodiment, the invention provides a vehicle including an internal combustion engine and first and second hydraulic pump/motors. The first hydraulic pump/motor is coupled with the internal combustion engine to mechanically establish a driving connection therebetween, and is operable in a pump mode to compress a hydraulic fluid under power of the internal combustion engine. The second hydraulic pump/motor is coupled with at least one driven wheel of the vehicle to mechanically establish a driving connection therebetween, and is operable in a motor mode to drive the at least one driven wheel when supplied with compressed hydraulic fluid. A clutch establishes the driving connection between the first hydraulic pump/motor and the internal combustion engine. The clutch is disengageable to selectively interrupt the driving connection between the first hydraulic pump/motor and the internal combustion engine. At least one vehicle accessory device is coupled to the first hydraulic pump/motor. The at least one vehicle accessory device is operable under power of the internal combustion engine when the clutch is engaged and the internal combustion engine is running, and the at least one vehicle accessory device is operable directly by the first hydraulic pump/motor operating in a motor mode when the clutch is disengaged, regardless of whether or not the internal combustion engine is running.

In another embodiment, the invention provides a method of operating a vehicle. An internal combustion engine is provided. A first hydraulic pump/motor is provided and coupled with the internal combustion engine to mechanically establish a driving connection therebetween, the driving connection being selectively interruptible by the disengagement of a clutch. A second hydraulic pump/motor is provided and coupled with at least one driven wheel of the vehicle to mechanically establish a driving connection therebetween. At least one vehicle accessory device is provided and coupled to the first hydraulic pump/motor. The vehicle is operated in a first operating condition in which the internal combustion engine is running, the clutch is engaged, and both the first hydraulic pump/motor and the at least one vehicle accessory device are operated under power of the internal combustion engine. The vehicle is further operated in a second operating condition in which the clutch is disengaged, and the at least one vehicle accessory device is operated directly by the first hydraulic pump/motor operating in a motor mode.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
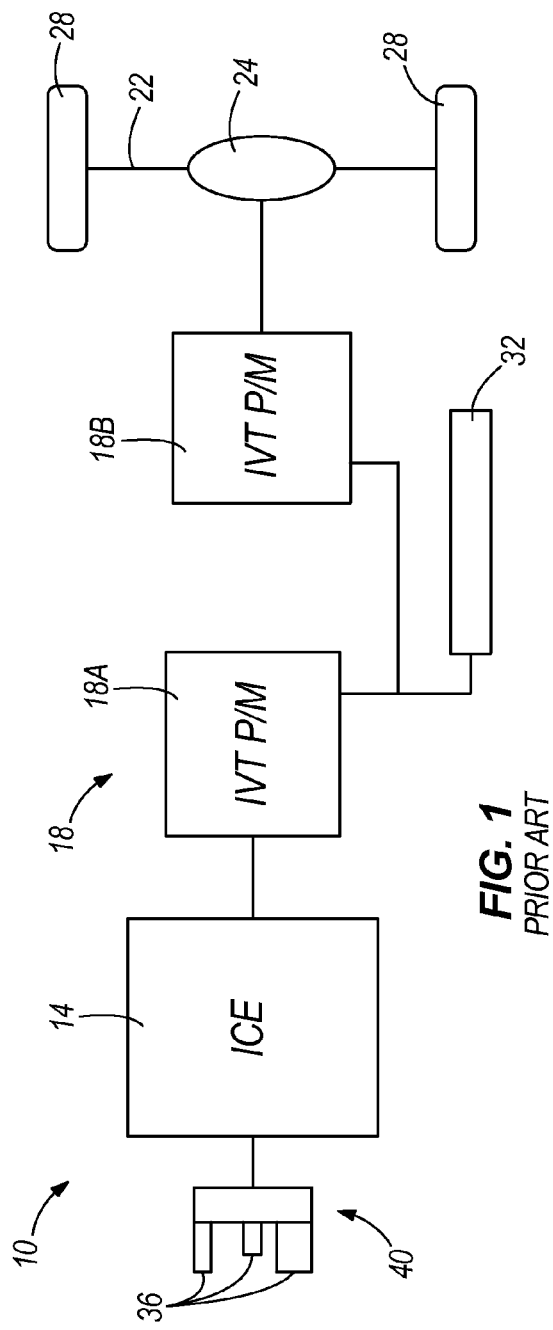
FIG. 1 is a prior art schematic of a vehicle having an infinitely variable transmission that includes a pair of hydraulic pump/motors.

FIG. 1 is representative of a basic vehicle configuration disclosed in U.S. Pat. No. 7,793,496, the entire contents of which are hereby incorporated by reference. The vehicle 10 of FIG. 1 includes a drive train comprising an internal combustion engine 14, an infinitely variable transmission (IVT) 18, an axle 22 having a differential 24, and at least one driven wheel 28 coupled to the axle 22. In this basic construction (other more complicated constructions are also disclosed in the U.S. Pat. No. 7,793,496), the IVT 18 is a serial hydraulic IVT that includes an engine-side hydraulic pump/motor 18A having a mechanical connection with the engine 14 and a driveline-side hydraulic pump/motor 18B having a mechanical connection with the at least one driven wheel 28. The two pump/motors 18A, 18B are fluidly coupled together in series, but no mechanical coupling (i.e., via shafts, gears, belts, etc.) is established therebetween. Both of the pump/motors 18A, 18B are fluidly coupled to an accumulator 32 configured to selectively store and release compressed hydraulic fluid. During normal driving operation of the vehicle 10, the internal combustion engine 14 drives the engine-side pump/motor 18A to operate in a pump mode to compress hydraulic fluid while the driveline-side pump/motor 18B is operated in a motoring mode to convert energy stored in compressed hydraulic fluid into mechanical work. The driveline-side pump/motor 18B is mechanically coupled to the differential 24 and to the at least one driven wheel 28 to rotate the wheels and move the vehicle. As shown in FIG. 1, the vehicle's forward direction is to the left, although the IVT 18 can be controlled to provide reverse motion, and a neutral state also. The at least one driven wheel 28 can include a front wheel, a rear wheel, or both. Only two wheels 28 on one axle 22 are shown, but the vehicle 10 can include additional axles and wheels.

Each of the pump/motors 18A, 18B of the IVT 18 can include a single pump/motor unit, or a plurality of pump/motor units coupled to a common shaft. Individual valve actuators in each pump/motor 18A, 18B can be operated independently to control the torque and speed output of the driveline-side pump/motor 18B to the wheels 28 of the vehicle 10. Details of such operation can be found in the U.S. Pat. No. 7,793,496. It should also be noted that a vehicle having a serial hydraulic IVT 18 such as that shown in FIG. 1 is operable to perform regenerative braking, whereby the vehicle's kinetic energy can be converted to stored energy by running the driveline-side pump/motor 18B in a pump mode to compress hydraulic fluid under power supplied from the axle 22 and the wheels 28. With this capability, the IVT 18 may be referred to as a serial "hybrid" hydraulic IVT 18. The vehicle 10 can also be controlled to perform an automatic stop/start driving sequence to stop the internal combustion engine 14 from running when the vehicle 10 is not moving. When the operator again demands movement of the vehicle 10, the driveline-side pump/motor 18B can operate to drive the at least one driven wheel 28 for a period of time with only stored energy in the form of compressed hydraulic fluid. The engine-side pump/motor 18A can also be used as a hydraulic starter to operate in a motor mode to start the internal combustion engine 14 by converting energy stored in compressed hydraulic fluid into mechanical work applied to the engine 14.

Although the vehicle 10 having the serial hydraulic IVT 18 of FIG. 1 provides many potential advantages, a problem arises with respect to running the vehicle accessories when the internal combustion engine 14 is turned off. As described above, the internal combustion engine 14 may be turned off automatically for increased economy when the vehicle 10 enters a predetermined condition (e.g., cruising, coasting, braking, and/or stopping). Since this is not an operator-commanded shutting off of the vehicle 10, it may be acceptable to turn off engine-specific accessory devices 36 such as a water pump and an oil pump, but the operator expects to have auxiliary functions of the vehicle 10 remain in operation through the duration of the engine's temporary stoppage. Thus, accessory devices 36 such as an alternator, an air conditioning compressor should be kept running to continue to supply the vehicle with electric power and cabin cooling as desired by the operator. Additional accessory devices 36 such as a power steering pump and a brake hydraulic pump may also be desirable to keep active during a temporary engine stoppage.

In the prior art vehicle 10 of FIG. 1, a conventional front end accessory drive (FEAD) 40 is coupled to a front end of the internal combustion engine 14. In other words, the FEAD 40 is coupled to an end of the engine's output shaft opposite a "rear" or output end to which the IVT 18 is coupled. Although the FEAD 40 is shown toward the front of the vehicle 10, it should be appreciated that the FEAD 40 may be physically positioned at a side of the engine 14 if the engine 14 has a transversely-oriented output shaft. The FEAD 40 enables the accessory devices 36 to be efficiently operated from the power of the engine 14 during times of engine operation. However, an alternate source of mechanical power, and means to decouple the FEAD 40 from the engine's output shaft, must also be provided if it is desired to enable the accessory devices 36 to operate during periods when the engine 14 is stopped. This presents a significant detriment to cost and complexity for operating the accessory drive system required in today's vehicles. Another option is to provide an electrically-driven FEAD in which the accessory devices are solely operated from an electric drive source (e.g., motor) completely independent from the internal combustion engine. However, efficiency is sacrificed by not taking advantage of the internal combustion engine's power when running, and hardware and controls are necessarily complicated by this approach.

Figure 2:
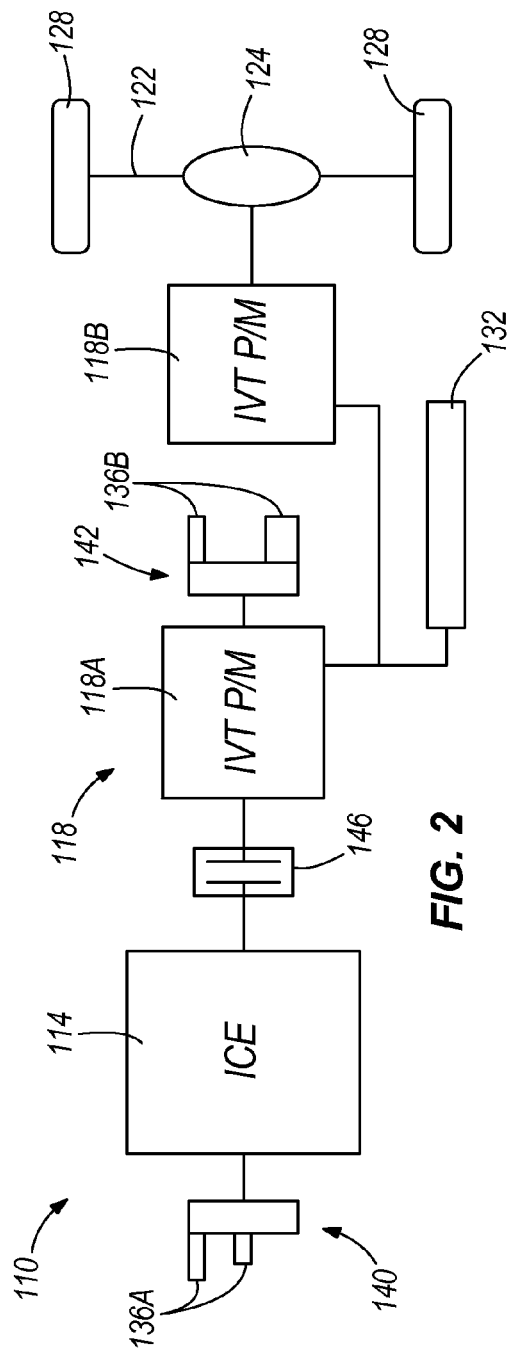
FIG. 2 is a schematic view of a vehicle and accessory drive system according to one construction of the invention.

FIG. 2 illustrates a vehicle 110 having a serial hydraulic IVT 118 similar to that of the vehicle 10 of FIG. 1, but the vehicle 110 includes an improved arrangement for driving the vehicle's accessory devices. The vehicle 110 is similar to the vehicle 10 of FIG. 1 in construction and operation, except as specifically noted below. The vehicle 110 offers at least all of the operational benefits of the vehicle 10 of FIG. 1, without the drawbacks associated with driving the vehicle accessory devices 36 when the engine 14 is not operating. Items similar to those of FIG. 1 are given similar reference numbers in FIG. 2, appended by a leading "1".

The front end accessory drive (FEAD) 140 is coupled to the internal combustion engine 114 (i.e., coupled to an output shaft of the engine 14) to receive power from the engine 14, when running. For example, the FEAD 140 can include a drive wheel (sprocket, pulley, etc.) coupled to the engine output shaft and coupled with one or more accessory devices 136A by a belt, a chain, or other transmission device. However, the accessory devices 136A coupled to the FEAD 140 are limited to engine-specific accessory devices, for example a water pump and an oil pump, that are only required to operate to support the engine's operation and are not particularly noticed by the operator when the vehicle 110 is stopped. On the other hand, other vehicle accessory devices 136B whose operation may be desired by the vehicle operator during times of engine stoppage are coupled to another accessory drive 142, which is an engine-side pump/motor accessory drive (EPMAD). The EPMAD 142 may be coupled directly to a shaft of the engine-side pump/motor 118A, or otherwise mechanically coupled to the engine-side pump/motor 118A so that the accessory devices 136B are drivable by motor operation of the engine-side pump/motor 118A. In some constructions, the accessory devices 136B coupled to the EPMAD 142 and drivable directly by the engine-side pump/motor 118A include at least one of an alternator, an air conditioning compressor, a power steering pump, and a brake hydraulic pump.

As shown in FIG. 2, a clutch 146 is provided between the internal combustion engine 114 and the engine-side pump/ motor 118A. The clutch 146 establishes a driving connection between the shaft of the engine-side pump/motor 118A and the output shaft of the internal combustion engine 114 that can be selectively interrupted when the clutch 146 is disengaged. In some constructions, the clutch 146 is a hydraulic clutch that utilizes the hydraulic power provided and stored by the IVT 118. Alternately, the clutch 146 can be a mechanical or electrically-actuated clutch. The clutch 146 can be actuated by the same control system that controls the operation of the IVT 118, by external switches controlled by the engine control unit, or by electrical switches that detect the necessary shaft speeds and other operating conditions. If it is not desired to utilize the engine-side pump/motor 118A for starting the internal combustion engine 114, the clutch 146 can be an over-riding or unidirectional clutch that is automatically engaged when the engine 114 drives the pump/motor 118A, and automatically disengaged when the engine 114 is stopped to prevent the pump/motor 118A from driving the engine 114.

During normal driving operation of the vehicle 110 in which the internal combustion engine 114 is running, the engine-specific accessory devices 136A are directly driven by power from the engine 114. The clutch 146 is engaged so that power from the engine 114 is also supplied to the engine-side pump/motor 118A. Power supplied from the engine 114 to the engine-side pump/motor 118A drives the EPMAD 142 while simultaneously driving the engine-side pump/motor 118A to operate in a pump mode. In the pump mode, the engine-side pump/motor 118A operates to compress hydraulic fluid and supply the compressed hydraulic fluid to the driveline-side pump/motor 118B, which operates in a motor mode to drive the at least one driven wheel 128 of the axle 122 through the differential 124. The pump/motors 118A, 118B are precisely controlled by a controller to modulate torque and speed output.

When the internal combustion engine 114 is automatically turned off during start/stop operation, the clutch 146 is disengaged, and the engine-side pump/motor 118A is supplied with compressed hydraulic fluid to operate in a motor mode to drive the EPMAD 142 and associated accessory devices 136B independently of the internal combustion engine 114. Thus, the engine-side pump/motor 118A is taken advantage of in another capacity, other than operating as the vehicle's transmission, to avoid the need to provide an additional motive source for driving the accessory devices 136B when the engine 114 is stopped. Efficiency is also optimized by the configuration of the vehicle 110 of FIG. 2 since it is more efficient to use the engine 114 rather than stored/recovered energy for accessory power, and when the engine 114 is not operating, using the engine-side pump/motor 118A as an accessory drive provides more efficient motive power than using additional electric or hydraulic motive sources. The hydraulic fluid to run the EPMAD 142 and the accessory devices 136B may be compressed and stored by a regenerative braking function of the IVT 118, further enhancing the efficiency of the vehicle 110.

Figure 3:
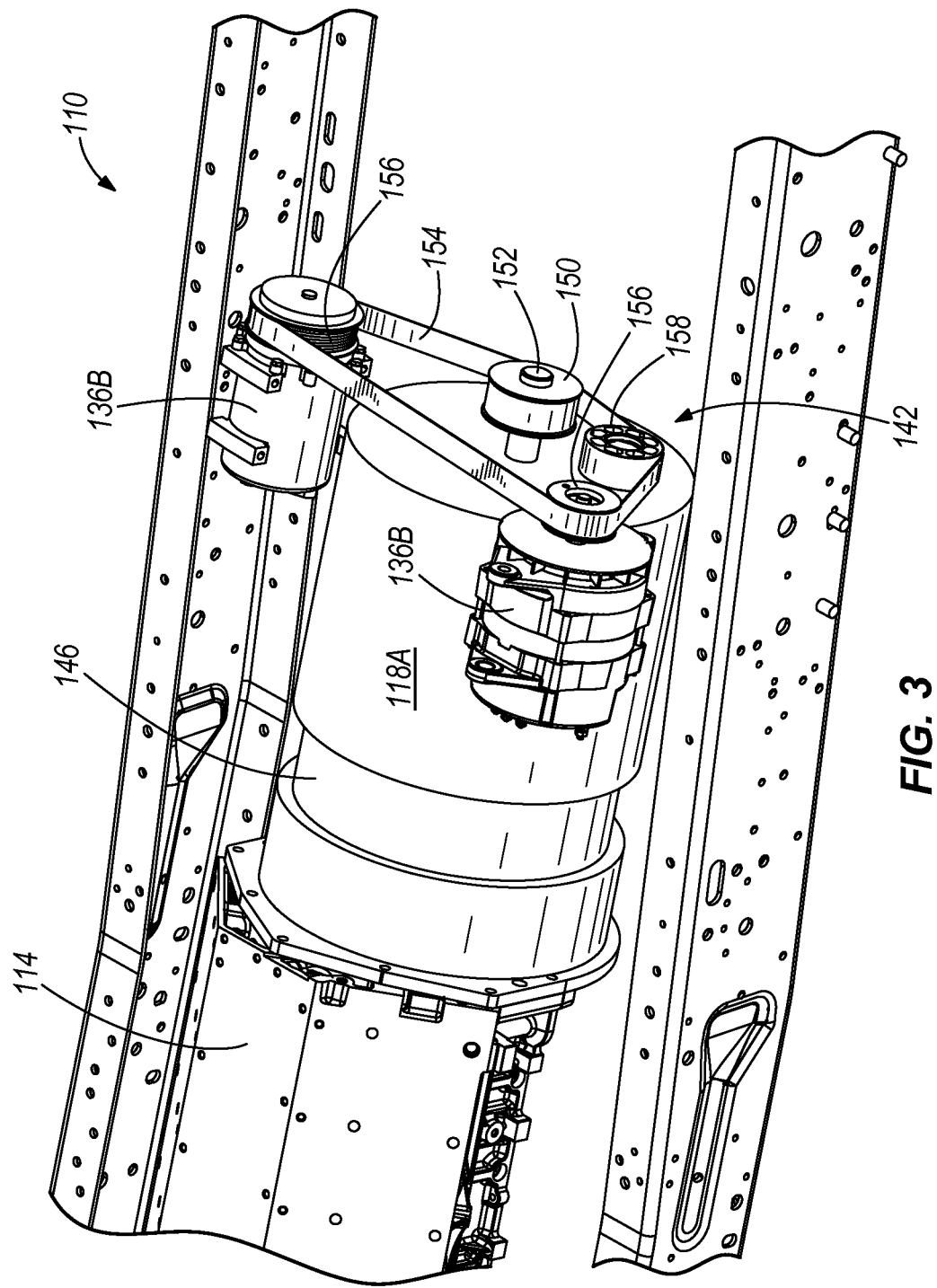
FIG. 3 is a perspective view of a vehicle and accessory drive system according to the schematic view of FIG. 2.

FIG. 3 shows a perspective view of a possible construction of a vehicle 110 according to the schematic of FIG. 2. The engine 114, the clutch 146, the engine-side pump/motor 118A, the EPMAD 142, and two accessory devices 136B are shown. In the construction of FIG. 3, the EPMAD 142 includes a drive wheel 150 on a shaft 152 of the engine-side pump/motor 118A. The drive wheel 150 is drivingly coupled by a belt 154 to a driven wheel 156 on each of the accessory devices 136B so that the accessory devices 136B can be rotated by the drive wheel 150. The belt 154 is also wound around an idler wheel 158. The illustrated EPMAD 142 provides a direct drive of the accessory devices 136B from the shaft of the engine-side pump/motor 118A, in a speed ratio according to the ratio of the diameters of the drive wheel 150 and the driven wheels 156. However, the accessory devices 136B can be indirectly driven by additional gears, belts, etc. in other constructions. It should also be noted that the EPMAD 142 can include sprockets and one or more chains, a set of intermeshing gears, or other devices as opposed to wheels 150, 156 and a belt 154.

Figure 4:
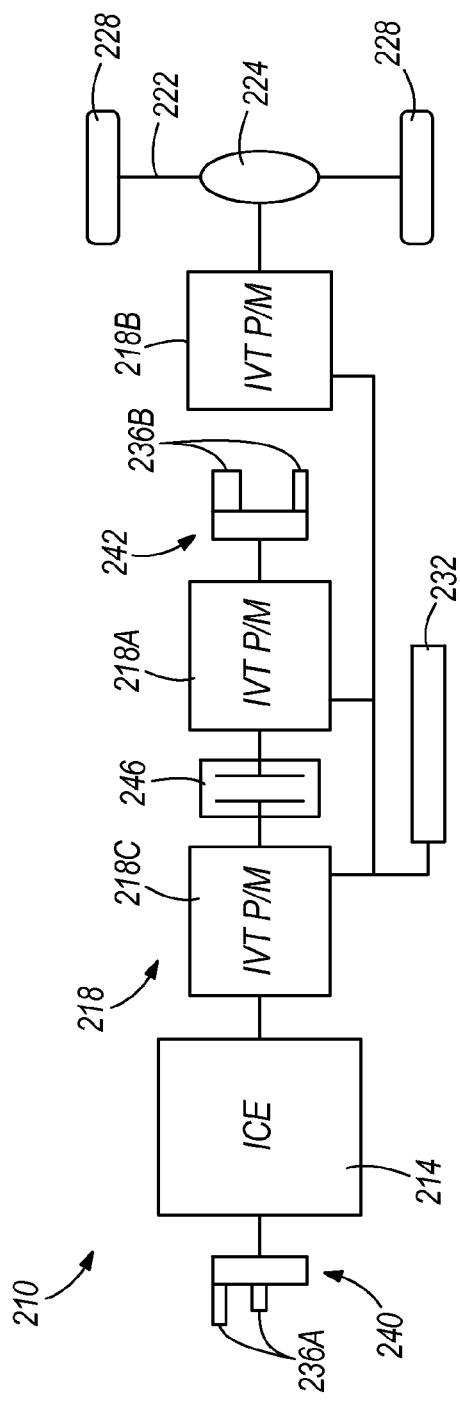
FIG. 4 is a schematic view of a vehicle and accessory drive system according to another construction of the invention.

FIG. 4 is a schematic of a vehicle 210 similar to the vehicle 110 schematically illustrated in FIG. 2. Except as specifically noted below, the vehicle 210 is similar in all respects to the vehicle 110 of FIGS. 2-3, and reference to the above description is hereby made for common features and functions. Items similar to those of FIG. 2 are given similar reference numbers in FIG. 4, where the leading digit is changed from "1" to "2".

The vehicle 210 of FIG. 4 is schematically identical to that of FIG. 2 except for the inclusion of an additional engine-side pump/motor 218C positioned between the internal combustion engine 214 and the engine-side pump/motor 218A that drives the accessory devices 236B via the EPMAD 242. Described another way, the engine-side portion of the IVT 218 is directly (clutchlessly) coupled to the internal combustion engine 214 and is constituted by an "upstream" pump/motor 218C (closer to engine 214) and a "downstream" pump/motor 218A (further from engine 214) that are disengageable by a clutch 246 positioned therebetween.

The engine-side pump/motors 218A, 218C of FIG. 4 can be operated in pump mode together, motor mode together, or separately with one in pump mode and the other in motor mode. For example, with the clutch 246 engaged, the engine-side pump/motors 218A, 218C can be operated together in a pump mode to deliver hydraulic power to the driveline-side pump/motor 218B. Alternately, with the clutch 246 engaged, the engine-side pump/motors 218A, 218C can be operated together in a motor mode to start the internal combustion engine 214. With the clutch 246 disengaged, the upstream engine-side pump/motor 218C can be driven by the engine 214 to provide hydraulic power, while the downstream engine-side pump/motor 218A can be used as a motor to rotate the EPMAD-mounted accessory devices 236B at a different speed from the output shaft of the engine 214. Also, with the clutch 246 disengaged, the downstream engine-side pump/motor 218A can be used to operate the accessory devices 236B during periods that the engine 214 is turned off during automatic start/stop operation.

Figure 5:
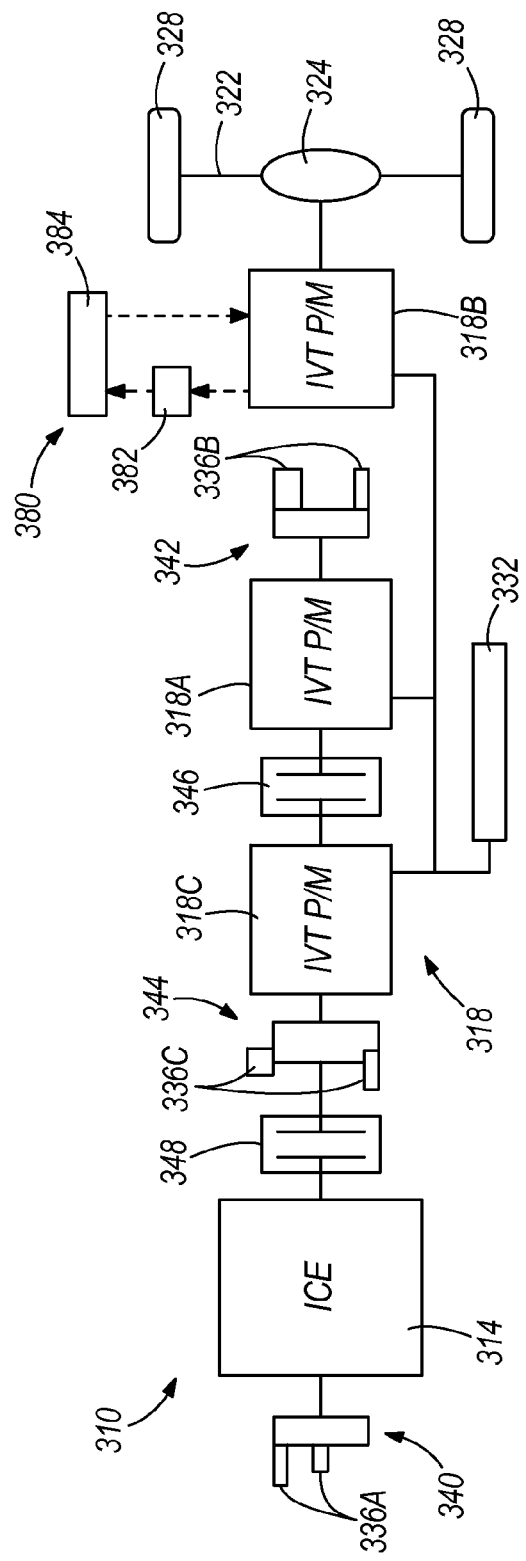
FIG. 5 is a schematic view of a vehicle and accessory drive system according to another construction of the invention.

FIG. 5 is a schematic of a vehicle 310 similar to the vehicle 210 schematically illustrated in FIG. 4. Except as specifically noted below, the vehicle 310 is similar in all respects to the vehicle 210 of FIG. 4, and reference to the above description is hereby made for common features and functions. Items similar to those of FIG. 4 are given similar reference numbers in FIG. 5, where the leading digit is changed from "2" to "3".

The vehicle 310 of FIG. 5 is schematically similar to that of FIG. 4 except that in addition to an "intermediate" clutch 346 between the two engine-side pump/motors 318A, 318C, the vehicle 310 includes an "engine-side" clutch 348 positioned between the internal combustion engine 314 and the upstream engine-side pump/motor 318C to selectively establish a mechanical connection therebetween. The vehicle 310 of FIG. 5 also includes an accessory drive 344 coupled with the upstream engine-side pump/motor 318C downstream of the engine-side clutch 348 (i.e., a second EPMAD 344). With this configuration, accessory devices 336C of the accessory drive 344 can be operated by the upstream engine-side pump/motor 318C at any time, independently of the operation of the engine 314 and independently of the operation of the downstream engine-side pump/motor 318A. For example, the accessory devices 336C of the accessory drive 344 may include engine-supporting accessory devices, such as a water pump and/or oil pump. It may be desirable or necessary in some circumstances of vehicle operation to operate an oil pump and/or water pump to manage the temperature of the engine 314 during periods of temporary engine stoppage to manage the engine's temperature.

When the engine-side clutch 348 is engaged, the IVT 318 offers all of the same functionality as that of the IVT 218 of FIG. 4, since the two engine-side pump/motors 318A, 318C can still be operated together or separately via the intermediate clutch 346. However, with the engine-side clutch 348 disengaged, the upstream engine-side pump/motor 318C can be isolated from the output shaft of the engine 314. Thus, the decision between jointly or individually operating the two engine-side pump/motors 318A, 318C can be made independently of the decision to couple or decouple the IVT 318 from the internal combustion engine 314. With this arrangement, the downstream engine-side pump/motor 318A can be used to operate the accessory devices 336B mounted on the second EPMAD 342 while the upstream engine-side pump/motor 318C is held stationary or rotated, speed-independent of the downstream engine-side pump/motor 318A, to operate the accessory devices 336 of the second EPMAD 344 and/or to start the engine 314 as required by the stop/start strategy.

The vehicle 310 of FIG. 5, and more particularly, the IVT 318 is also shown to include an optional subsystem 380 for absorbing energy (e.g., via hydraulic pressure reduction). The energy absorbing subsystem 380 of the illustrated construction is a pressure reduction circuit coupled with the driveline-side pump/motor 318B and including an energy-absorbing pressure reduction device 382 (e.g., orifice, pressure reducing valve, relief valve) in series with a heat exchanger or "cooler" 384. The illustrated pressure reduction circuit 380 represents a basic configuration of an energy absorber, but it will be appreciated that many variations on this concept, including duplication of components, various layouts, various types of pressure reduction devices and/or heat exchangers etc., are enabled from this disclosure. Although not illustrated, it is conceived that the pressure reduction subsystem 380 of FIG. 5 may be coupled to any of the driveline-side pump/motors shown in the drawings and discussed herein, including that of the prior art vehicle 10 of FIG. 1. Operation of the pressure reduction circuit is described further below.

Figure 6:
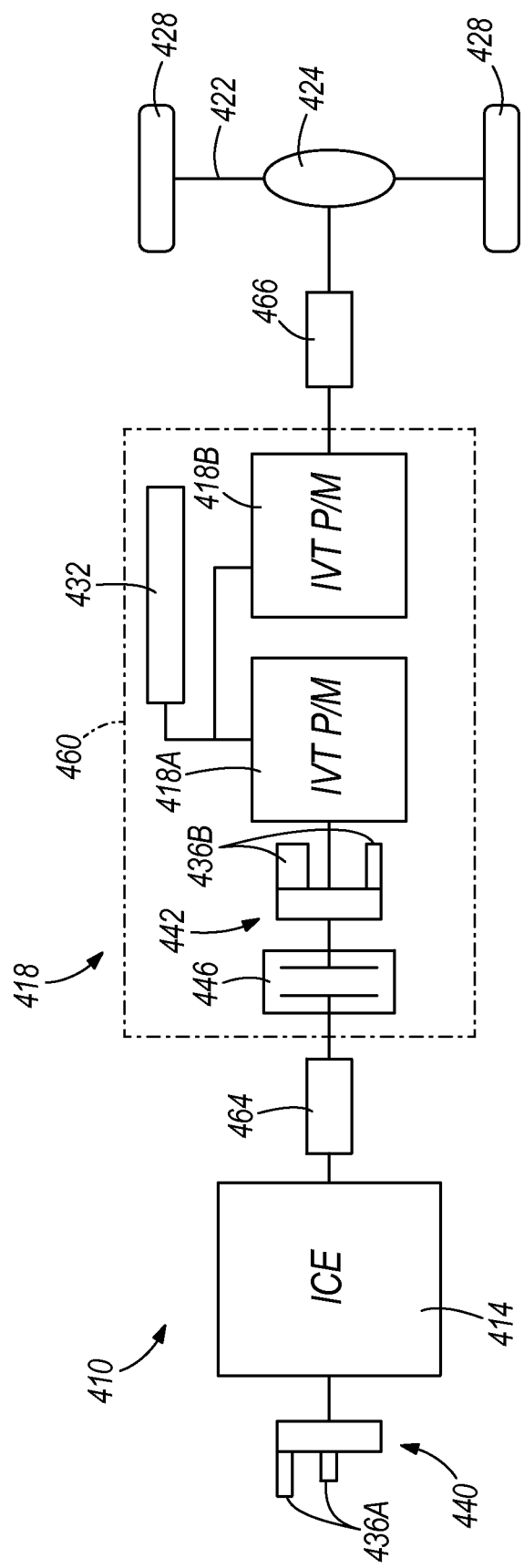
FIG. 6 is a schematic view of a vehicle and accessory drive system according to another construction of the invention.

FIG. 6 is a schematic of a vehicle 410 similar to the vehicle 110 schematically illustrated in FIG. 2. Except as specifically noted below, the vehicle 410 is similar in all respects to the vehicle 110 of FIG. 2, and reference to the above description is hereby made for common features and functions. Items similar to those of FIG. 2 are given similar reference numbers in FIG. 6, where the leading digit is changed from "1" to "4".

The vehicle 410 of FIG. 6 is schematically identical to that of FIG. 2 except that the IVT 418 in FIG. 6 is provided as a modular package, and the EPMAD 442 is coupled to the upstream end of the engine-side pump/motor 418A. The engine-side pump/motor 418A and the driveline-side pump/motor 418B are packaged together with associated hardware into a common housing 460 (e.g., frame or enclosure) that is coupled with the vehicle's chassis. At least one of the EPMAD 442, the clutch 446, and the accumulator 432 may also be packaged with the other components in the common housing 460 as shown, but alternately, at least one of the EPMAD 442, the clutch 446, and the accumulator 432 may be provided outside the common housing 460. The modular IVT unit 418 is connected to the internal combustion engine 414 with a first coupling 464, and is connected to the differential 424 of the driven axle 422 with a second coupling 466. It should be appreciated that the modular packaging of the IVT 418 shown in FIG. 6 may be modified from the exact configuration shown, and may also be adapted to any of the other vehicle configurations shown in FIGS. 2-6 and described above.

With respect to the position of the EPMAD 442 on the upstream side of the engine-side pump/motor 418A of FIG. 6, it should be appreciated that the EPMAD of any of the vehicles illustrated in FIGS. 2-6 can be coupled to either the upstream end or the downstream end of an engine-side pump/motor.

Another advantage provided by the vehicle configurations of FIGS. 2-6 described above is applicable to vehicles that require a retarder capability in addition to or as an alternative to foundation (i.e., wheel) brakes to slow the vehicle or inhibit undesired acceleration, which is especially useful for grade descents. Limitations of the engine-retarder systems in conventional vehicles using mechanical and automatic transmissions include but are not limited to excessive noise and that the engine, while performing retarder braking, may not rotate at the required speed to operate the accessory devices mounted to the front end accessory drive to meet vehicle needs and avoid undercharging or overcharging of the battery during long duration vehicle retarding events (i.e., long distance descents).

A vehicle equipped with a serial hydraulic transmission can perform transmission-induced retarder braking or "hydraulic transmission braking" in several ways. The serial hydraulic hybrid transmission 18 shown in FIG. 1 can provide the retarding function by operating the driveline-side pump/motor 18B in the pumping mode to pump hydraulic fluid to the engine-side pump/motor 18A operating in the motoring mode, rotating or "dragging" the internal combustion engine 14 as a load to the transmission to retard vehicle speed. However, the retarder braking effect must be balanced with the need to drive the vehicle accessory devices 36, which are coupled directly to the internal combustion engine 14. The present application presents several solutions for this problem while preserving and even enhancing the ability to perform hydraulic transmission braking.

Although any of the vehicles of FIGS. 2-6 can utilize an engine-side pump/motor to drive the internal combustion engine as a load, the transmissions of these vehicles are configured to enable operation of certain vehicle accessory devices as a hydraulic load, with or without the internal combustion engine rotating. In the vehicles of FIGS. 4 and 5, the separate engine-side pump/motors enable completely independent operation whereby the internal combustion engine can be used as a variable hydraulic load while the pump/motor-mounted accessory devices are operated independently in accordance with vehicle requirements. Operation of the accessory devices also serves as a hydraulic load, which contributes to transmission-induced retarder braking. Additional flexibility for transmission-induced retarder braking is provided with the addition of the energy-absorbing subsystem 380 shown in FIG. 5, which can provide a variable amount of retarder braking on command by operating the driveline-side pump/motor 18B in the pumping mode to pump hydraulic fluid through the pressure reduction subsystem 380, including the pressure reduction device 382, to absorb energy. Any or all of the above-described hydraulic loads may be used at a given time to achieve a desired braking effect for the vehicle, without compromising the operation of vehicle accessory devices coupled to the transmission.

Regardless of whether or not a particular vehicle is configured to operate with a regenerative braking function, the hydraulic transmission configurations of FIGS. 2-6 provide means to achieve hydraulic transmission braking while rotating the engine over a wider range of engine speeds, or without rotating the engine at all. As mentioned above, the energy-absorbing subsystem 380 of FIG. 5 can be incorporated with any of the driveline-side pump/motors illustrated in the drawings and described herein. Some particular modes of operation of these modified systems are described below.

In the configuration shown in FIG. 2, the clutch 146 between the internal combustion engine 114 and the engine-side pump/motor 118A can be disengaged so that the engine-side pump/motor 118A, using pressurized hydraulic fluid supplied by the driveline-side pump/motor 118B operating in the pumping mode, can be operated in the motoring mode at the required speed to drive the EPMAD 142 and operate the accessory devices 136B while a remainder of the pressurized hydraulic fluid not required for this task is routed to the pressure reduction device 382 to absorb energy. The optional heat exchanger 384 may be provided to moderate the temperature of the pressure reduction device 382 and prevent overheating. The internal combustion engine 114 can continue to run during transmission-induced retarder braking, or it can be stopped. With respect to transmission-induced retarder braking, the vehicle 410 of FIG. 6 offers the same functionality as that of FIG. 2 described above.

With the configurations of FIG. 4 or FIG. 5, in which multiple upstream engine-side pump/motors are provided, transmission-induced retarder braking can be carried out according to operation similar to that of FIG. 2. For example, the downstream engine-side pump/motor 218A, 318A of each vehicle can be operated in a motoring mode at a desired speed, independent from the engine 214, 314 and the upstream engine-side pump/motor 218C, 318C, to permit proper operation of the EPMAD 242, 342 and the accessory devices 236B, 336B. The energy supplied to drive the downstream engine-side pump/motor 218A, 318A in the motoring mode is provided as pressurized hydraulic fluid from the driveline-side pump/motor 218B, 318B operating in a pumping mode (i.e., driven by the wheels 228, 328). Meanwhile, a remainder of the pressurized hydraulic fluid not required by the downstream engine-side pump/motor 218A, 318A to drive the EPMAD-mounted accessory devices 236B, 336B can be routed to the energy-absorbing subsystem 380, including the pressure reduction device 382 to absorb energy. The engine 214, 314 is not necessary during periods of transmission-induced retarder braking, and may be stopped. Furthermore, the vehicles 210, 310 of FIGS. 4-5 can also operate the upstream engine-side pump/motor 218C, 318C in a pumping mode to drive the internal combustion engine 214, 314 as a load to assist in slowing the vehicle's speed without foundation brakes. Driving the internal combustion engine 214, 314 as a load may occur simultaneously with or in lieu of the above-described retarder function, all while independently powering the EPMAD-mounted accessory devices 236B, 336B with the downstream engine-side pump/motor 218A, 318A to support vehicle requirements.

What is claimed is:

1. A vehicle comprising:
   an internal combustion engine;
   a first hydraulic pump/motor coupled with the internal combustion engine to mechanically establish a driving connection therebetween, the first hydraulic pump/motor being operable in a pump mode to compress a hydraulic fluid under power of the internal combustion engine;
   a second hydraulic pump/motor coupled with at least one driven wheel of the vehicle to mechanically establish a driving connection therebetween, the second hydraulic pump/motor being operable in a motor mode to drive the at least one driven wheel when supplied with compressed hydraulic fluid;
   a clutch establishing the driving connection between the first hydraulic pump/motor and the internal combustion engine, the clutch being disengageable to selectively interrupt the driving connection between the first hydraulic pump/motor and the internal combustion engine; and
   at least one vehicle accessory device coupled to the first hydraulic pump/motor, wherein the at least one vehicle accessory device is operable under power of the internal combustion engine when the clutch is engaged and the internal combustion engine is running, and the at least one vehicle accessory device is operable directly by the first hydraulic pump/motor operating in a motor mode when the clutch is disengaged, regardless of whether or not the internal combustion engine is running;
   a third hydraulic pump/motor positioned between the first hydraulic pump/motor and the internal combustion engine, the third hydraulic pump/motor coupled with the internal combustion engine and the first hydraulic pump/motor to establish a driving connection therebetween,
   wherein the clutch is positioned between the first and third hydraulic pump/motors, and the first and third hydraulic pump/motors are simultaneously operable in different respective modes, chosen from a pump mode and a motor mode, when the clutch is disengaged, and are operable in a single combined mode, chosen from a pump mode and a motor mode, when the clutch is engaged.

2. The vehicle of claim 1, further comprising a second clutch establishing a driving connection between the third hydraulic pump/motor and the internal combustion engine that can be selectively interrupted when the second clutch is disengaged.

3. The vehicle of claim 1, wherein the at least one vehicle accessory device includes at least one of an air conditioning compressor, an alternator, a power steering pump, and a brake hydraulic pump.

4. The vehicle of claim 3, further comprising at least one engine accessory device coupled to the internal combustion engine remotely from the first hydraulic pump/motor and configured to be solely drivable by the internal combustion engine.

5. The vehicle of claim 4, wherein the at least one engine accessory device includes at least one of a water pump and an oil pump.

6. The vehicle of claim 1, wherein the first and second hydraulic pump/motors are provided in a common housing as a modular package.

7. The vehicle of claim 3, wherein the clutch is provided in the common housing as part of the modular package.

8. The vehicle of claim 1, further comprising a pressure reduction device fluidly coupled to the first hydraulic pump/motor to dissipate energy from compressed hydraulic fluid and provide a vehicle braking effect when the vehicle is in an operating condition where the second hydraulic pump/motor is driven in a pump mode by the at least one driven wheel, and the first hydraulic pump/motor is driven in a motor mode by the second hydraulic pump/motor.

9. The vehicle of claim 1, wherein the driving connection between the internal combustion engine and the first hydraulic pump/motor is established on a first side of the first hydraulic pump/motor, and wherein the at least one vehicle accessory device is coupled to the first side of the first hydraulic pump/motor.

10. A vehicle comprising:
an internal combustion engine;
a first hydraulic pump/motor coupled with the internal combustion engine to mechanically establish a driving connection therebetween, the first hydraulic pump/motor being operable in a pump mode to compress a hydraulic fluid under power of the internal combustion engine;
a second hydraulic pump/motor coupled with at least one driven wheel of the vehicle to mechanically establish a driving connection therebetween, the second hydraulic pump/motor being operable in a motor mode to drive the at least one driven wheel when supplied with compressed hydraulic fluid;
a clutch establishing the driving connection between the first hydraulic pump/motor and the internal combustion engine, the clutch being disengageable to selectively interrupt the driving connection between the first hydraulic pump/motor and the internal combustion engine; and
at least one vehicle accessory device coupled to the first hydraulic pump/motor, wherein the at least one vehicle accessory device is operable under power of the internal combustion engine when the clutch is engaged and the internal combustion engine is running, and the at least one vehicle accessory device is operable directly by the first hydraulic pump/motor operating in a motor mode when the clutch is disengaged, regardless of whether or not the internal combustion engine is running,
wherein the driving connection between the internal combustion engine and the first hydraulic pump/motor is established on a first side of the first hydraulic pump/motor, and wherein the at least one vehicle accessory device is coupled to a second side of the first hydraulic pump/motor that is remote from the first side.

11. A method of operating a vehicle, the method comprising:
providing an internal combustion engine;
providing a first hydraulic pump/motor coupled with the internal combustion engine to mechanically establish a driving connection therebetween, the driving connection being selectively interruptible by the disengagement of a clutch;
providing a second hydraulic pump/motor coupled with at least one driven wheel of the vehicle to mechanically establish a driving connection therebetween;
providing at least one vehicle accessory device coupled to the first hydraulic pump/motor;
operating the vehicle in a first operating condition in which the internal combustion engine is running, the clutch is engaged, and both the first hydraulic pump/motor and the at least one vehicle accessory device are operated under power of the internal combustion engine;
operating the vehicle in a second operating condition in which the clutch is disengaged, and the at least one vehicle accessory device is operated directly by the first hydraulic pump/motor operating in a motor mode; and
providing a third hydraulic pump/motor coupled between the internal combustion engine and the first hydraulic pump/motor to establish a driving connection therebetween, the clutch being positioned between the first and third hydraulic pump/motors.

12. The method of claim 11, further comprising turning off the internal combustion engine in the second operating condition.

13. The method of claim 11, further comprising simultaneously operating the first and third hydraulic pump/motors in different respective modes, chosen from a pump mode and a motor mode, when the clutch is disengaged.

14. The method of claim 11, further comprising simultaneously operating the first and third hydraulic pump/motors in a single combined mode, chosen from a pump mode and a motor mode, when the clutch is engaged.

15. The method of claim 11, further comprising selectively interrupting a driving connection between the third hydraulic pump/motor and the internal combustion engine by disengaging a second clutch positioned therebetween.

16. The method of claim 11, wherein the at least one vehicle accessory device operated in the first and second operating conditions includes at least one of an air conditioning compressor, an alternator, a power steering pump, and a brake hydraulic pump.

17. The method of claim 11, further comprising:
providing at least one engine accessory device coupled to the internal combustion engine remotely from the first hydraulic pump/motor; and
operating the at least one engine accessory device solely by the internal combustion engine.

18. The method of claim 11, further comprising providing the first and second hydraulic pump/motors in a common housing as a modular package.

19. A method of operating a vehicle, the method comprising:
providing an internal combustion engine;
providing a first hydraulic pump/motor coupled with the internal combustion engine to mechanically establish a driving connection therebetween, the driving connection being selectively interruptible by the disengagement of a clutch;
providing a second hydraulic pump/motor coupled with at least one driven wheel of the vehicle to mechanically establish a driving connection therebetween;
providing at least one vehicle accessory device coupled to the first hydraulic pump/motor;
operating the vehicle in a first operating condition in which the internal combustion engine is running, the clutch is engaged, and both the first hydraulic pump/motor and the at least one vehicle accessory device are operated under power of the internal combustion engine;
operating the vehicle in a second operating condition in which the clutch is disengaged, and the at least one vehicle accessory device is operated directly by the first hydraulic pump/motor operating in a motor mode;
enacting hydraulic transmission braking of the vehicle by driving the second hydraulic pump/motor with the at least one driven wheel to operate the second hydraulic pump/motor in a pumping mode to drive a hydraulic load, the hydraulic load including at least one of a pressure reduction device fluidly coupled to the second hydraulic pump/motor, the internal combustion engine in a non-running state driven by the first hydraulic pump/motor in a motoring mode, and the at least one vehicle accessory device driven by the first hydraulic pump/motor in a motoring mode; and
operating the at least one vehicle accessory device with the first hydraulic pump/motor in a pump mode at a speed independent of a rotational speed of the internal combustion engine while performing the hydraulic transmission braking.

\* \* \* \* \*

UNITED STATES PATENT AND TRADEMARK OFFICE
CERTIFICATE OF CORRECTION

| | | |
|---|---|---|
| PATENT NO. | : 8,893,489 B2 | Page 1 of 1 |
| APPLICATION NO. | : 13/163444 | |
| DATED | : November 25, 2014 | |
| INVENTOR(S) | : William Donohue | |

It is certified that error appears in the above-identified patent and that said Letters Patent is hereby corrected as shown below:

In The Claims

Column 10, claim 7, line 55: delete "3" and insert --6--

Signed and Sealed this
Tenth Day of March, 2015

Michelle K. Lee
*Deputy Director of the United States Patent and Trademark Office*